US010278155B1

(12) United States Patent
Silverman et al.

(10) Patent No.: US 10,278,155 B1
(45) Date of Patent: Apr. 30, 2019

(54) MONITOR RADIO ASSISTED FINE TIMING MEASUREMENT FOR LOCATION APPLICATIONS

(71) Applicant: Cisco Technology, Inc., San Jose, CA (US)

(72) Inventors: Matthew A. Silverman, Shaker Heights, OH (US); Zhigang Gao, Twinsburg, OH (US); John Matthew Swartz, Lithia, FL (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/875,043

(22) Filed: Jan. 19, 2018

(51) Int. Cl.
*H04W 64/00* (2009.01)
*H04W 24/08* (2009.01)

(52) U.S. Cl.
CPC .......... *H04W 64/006* (2013.01); *H04W 24/08* (2013.01)

(58) Field of Classification Search
CPC .......................... H04W 64/006; H04W 24/08
See application file for complete search history.

(56) References Cited

U.S. PATENT DOCUMENTS

| | | | | |
|---|---|---|---|---|
| 9,167,542 | B2 * | 10/2015 | Do | G01S 5/021 |
| 9,222,785 | B2 * | 12/2015 | Banin | G01S 5/021 |
| 9,456,306 | B2 * | 9/2016 | Wang | H04W 4/023 |
| 9,459,337 | B2 * | 10/2016 | Aldana | G01S 5/00 |
| 9,766,321 | B2 * | 9/2017 | Schwartz | G01S 5/14 |
| 10,034,188 | B2 * | 7/2018 | Ben-Haim | G01S 5/14 |
| 2015/0094103 | A1 | 4/2015 | Wang et al. | |
| 2016/0044524 | A1 | 2/2016 | Ben-Haim et al. | |

OTHER PUBLICATIONS

Kevin B. Stanton, "802.1AS Tutorial", Intel Corporation, Nov. 13, 2008, 802.1 AVB TG / Nov. 2008 Plenary, http://www.ieee802.org/1/files/public/docs2008/as-kbstanton-8021AS-overview-for-dot11aa-1108.pdf, 42 pages.

Edward Au, "The Latest Progress on IEEE 802.11mc and IEEE 802.11ai", IEEE Vehicular Technology Magazine, Sep. 2016, 3 pages.

(Continued)

*Primary Examiner* — Marcos L Torres
(74) *Attorney, Agent, or Firm* — Edell, Shapiro & Finnan, LLC

(57) ABSTRACT

A plurality of first wireless devices monitor a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device. Using a timing error computed from the estimated location, a modification is made of the time of transmission of the first transmission to produce a first modified timestamp and of the time of reception of the second transmission to produce a second modified timestamp. A ranging measurement is computed of the target wireless device relative to the second wireless device using the first modified timestamp and the second modified timestamp.

20 Claims, 5 Drawing Sheets

(56) References Cited

OTHER PUBLICATIONS

Kevin B. Stanton, "The use of 802.11 Timing Measurement by p802.1ASbt / p802.1AS-Rev", Intel Corporation, Jul. 14, 2014, 7 pages.
Kamiar Radnosrati, et al., "New Trends in Radio Network Positioning", 2015 18th International Conference on Information Fusion, Jul. 6-9, 2015, Washington D.C., 7 pages.
Aneeq Mahmood, et al., "Clock Synchronization Over IEEE 802.11—A Survey of Methodologies and Protocols", IEEE Transactions on Industrial Informatics, vol. 13, No. 2, Apr. 2017, 16 pages.

* cited by examiner

400

410 — AT A PLURALITY OF FIRST WIRELESS DEVICES, MONITORING A RANGING EXCHANGE OF TRANSMISSIONS BETWEEN A TARGET WIRELESS DEVICE AND A SECOND WIRELESS DEVICE IN ORDER TO RECORD FOR EACH OF THE PLURALITY OF FIRST WIRELESS DEVICES A TIME OF RECEPTION OF A FIRST TRANSMISSION THAT IS SENT FROM THE SECOND WIRELESS DEVICE TO THE TARGET WIRELESS DEVICE AND A TIME OF RECEPTION OF A SECOND TRANSMISSION THAT IS SENT FROM THE TARGET WIRELESS DEVICE TO THE SECOND WIRELESS DEVICE

420 — COMPUTING AN ESTIMATED LOCATION FOR THE TARGET WIRELESS DEVICE BASED ON THE RESPECTIVE TIMES OF RECEPTION OF THE FIRST TRANSMISSION AND OF THE SECOND TRANSMISSION AT EACH OF THE PLURALITY OF FIRST WIRELESS DEVICES AND BASED ON A TIME OF TRANSMISSION OF THE FIRST TRANSMISSION BY THE SECOND WIRELESS DEVICE AND A TIME OF RECEPTION OF THE SECOND TRANSMISSION AT THE SECOND WIRELESS DEVICE OBTAINED FROM THE SECOND WIRELESS DEVICE

430 — COMPUTING A TIMING ERROR BASED ON THE ESTIMATED LOCATION

440 — MODIFYING, WITH THE TIMING ERROR, THE TIME OF TRANSMISSION OF THE FIRST TRANSMISSION FROM THE SECOND WIRELESS DEVICE TO PRODUCE A FIRST MODIFIED TIMESTAMP AND MODIFYING THE TIME OF RECEPTION OF THE SECOND TRANSMISSION AT THE SECOND WIRELESS DEVICE TO PRODUCE A SECOND MODIFIED TIMESTAMP

450 — COMPUTING A RANGING MEASUREMENT OF THE TARGET WIRELESS DEVICE RELATIVE TO THE SECOND WIRELESS DEVICE USING THE FIRST MODIFIED TIMESTAMP AND THE SECOND MODIFIED TIMESTAMP

FIG.5

MONITOR RADIO ASSISTED FINE TIMING MEASUREMENT FOR LOCATION APPLICATIONS

TECHNICAL FIELD

The present disclosure relates to wireless location techniques.

BACKGROUND

In the fine timing measurement (FTM) procedure specified by IEEE 802.11mc, a client device and wireless access point (AP) perform a ranging exchange process. A client will perform this ranging process with several APs until it has enough information to determine its own location. Multipath and other conditions can impair FTM measurements and result in poor location computations.

BRIEF DESCRIPTION OF THE DRAWINGS

FIG. 5 is a flow chart of a method for monitor radio assisted timing measurements, according to an example embodiment.

DESCRIPTION OF EXAMPLE EMBODIMENTS

Overview

In accordance with an example embodiment, techniques are provided for monitor radio assisted timing measurements useful in location applications of wireless devices. A plurality of first wireless devices monitor a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device. A computing apparatus computes an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device. The computing apparatus computes a timing error based on the estimated location. Using the timing error, the computing apparatus modifies the time of transmission of the first transmission from the second wireless device to produce a first modified timestamp and modifying the time of reception of the second transmission at the second wireless device to produce a second modified timestamp. A ranging measurement is computed (by the computing apparatus, the target wireless device or another entity) of the target wireless device relative to the second wireless device using the first modified timestamp and the second modified timestamp.

Example Embodiments

Presented herein are techniques to leverage additional radio devices in the network to improve fine timing measurements useful for wireless location applications. These additional radio devices may be receive-only/monitor radio devices or they may be devices fully capable of receiving and transmitting.

Figure 1:
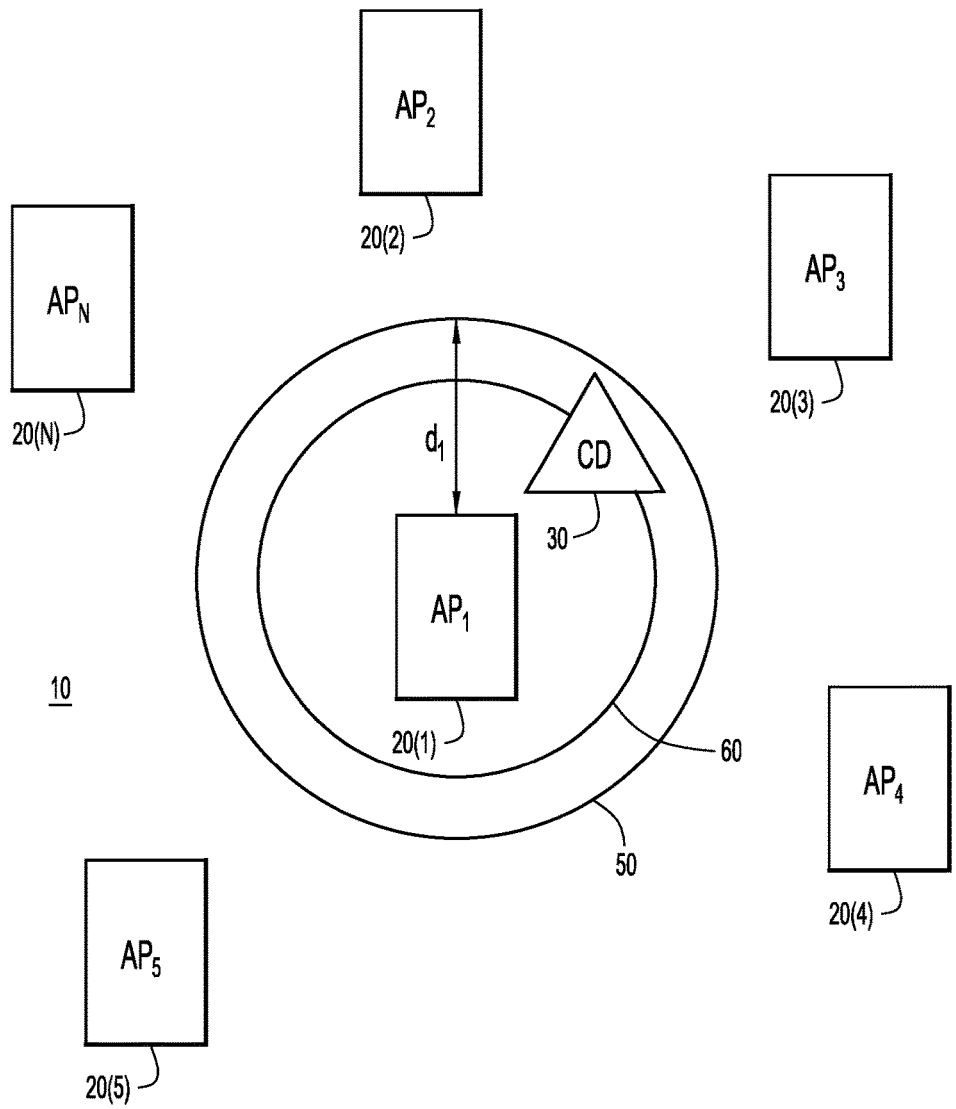
FIG. 1 is diagram of a wireless network in which monitor radio assisted timing measurement techniques may be employed, according to an example embodiment.

Reference is first made to FIG. 1. FIG. 1 shows a high-level diagram of a wireless network 10. In one example, the wireless network is an IEEE 802.11 wireless local area network (WLAN). The wireless network includes a plurality of access points (APs) 20(1)-20(N) and a client device (CD) 30. The AP 20(1) may be the serving AP for the client device 30.

At some point in time, the client device 30 may initiate a ranging procedure with respect to the AP 20(2) in order to determine its physical location. The physical location of the client device may be useful for a variety of location-based applications now known or hereinafter developed. If the client device 30 can perform a ranging procedure with multiple APs each at a known location, then the client device 30 can using the ranging measurements (distance between the client device and the respective AP) with respect to multiple APs to determine its physical (x,y,z) coordinate) location. An example of a ranging procedure is the fine time measurement (FTM) procedures specified in IEEE 802.11mc.

The result of a ranging procedure between the client device 30 and an AP is a time of flight ($T_{tof}$) measurement. Each time of flight measurement represents the time it takes for a packet to wirelessly travel from the client device 30 to the AP. Given the speed of light, c, each $T_{tof}$ represents a circle around the AP where the client could be located, as denoted by the equation: $d_n = T_{tof,n}/c$. Thus, as shown in FIG. 1, the client device 30 determines, based on a ranging procedure with the AP 20(1) that it is at a distance $d_1$ from the AP 20(1), and this distance $d_1$ corresponds to the circle 50 shown in FIG. 1. The intersection of multiple circles, each circle representing a distance between the client device and a different AP, yields a location estimate. Thus, if the client device performs a location procedure with respect to multiple APs (e.g., 3 or more), it can determine its estimated location.

However, the accuracy of a time of flight measurement is driven by multipath conditions in the environment and timestamping accuracy (by hardware and/or software) on the AP and client device. Multipath can add a bias in the time of flight measurement that leads to location error. For example, while the client device 30 may compute a ranging measurement that places it on the circle 50 at distance $d_1$ from AP 20(1), this may not accurate, and it may actually be closer to the AP 20(1), such as on the circle 60 from AP 20(1).

There are also scaling and accuracy issues. The more APs involved in the location solution, the more accurate the location solution will be due to the multipath being de-correlated across APs. However, the more APs involved in a location solution, the more overhead on the wireless radio frequency channel. A client device may be able to perform ranging exchanges with only a few APs before it computes a location estimate.

Thus, according to the techniques presented herein, other radio devices in the radio frequency vicinity of the AP 20(1) and client device 30 will "overhear" the transmissions between the AP 20(1) and client device 30 during the ranging procedure. These other radio devices are not participating in the ranging procedure, but because they can receive the wireless transmissions sent between the AP and the client device participating in the ranging procedure, they can be a source of additional time of flight measurements from the ranging procedure to improve a location estimation of the client device without adding any additional overhead (in the wireless channel/medium) to the ranging procedure. Examples of such "other radio devices" include any of the other APs 20(2)-20(N) shown in FIG. 1. These other radio devices may be referred to as "monitor" radio device since they are merely monitoring (receiving) the radio transmissions between other devices in order to obtain additional time of flight measurements. Again, the monitor radio devices are not actually participating in the transmission exchanges of a given ranging procedure.

The techniques presented herein may be especially useful when the client device is unable to obtain measurements from many APs either due to the network limiting the exchanges to avoid channel overhead or the client itself choosing to only attempt exchanges with a few/minimal number of APs.

Figure 2:
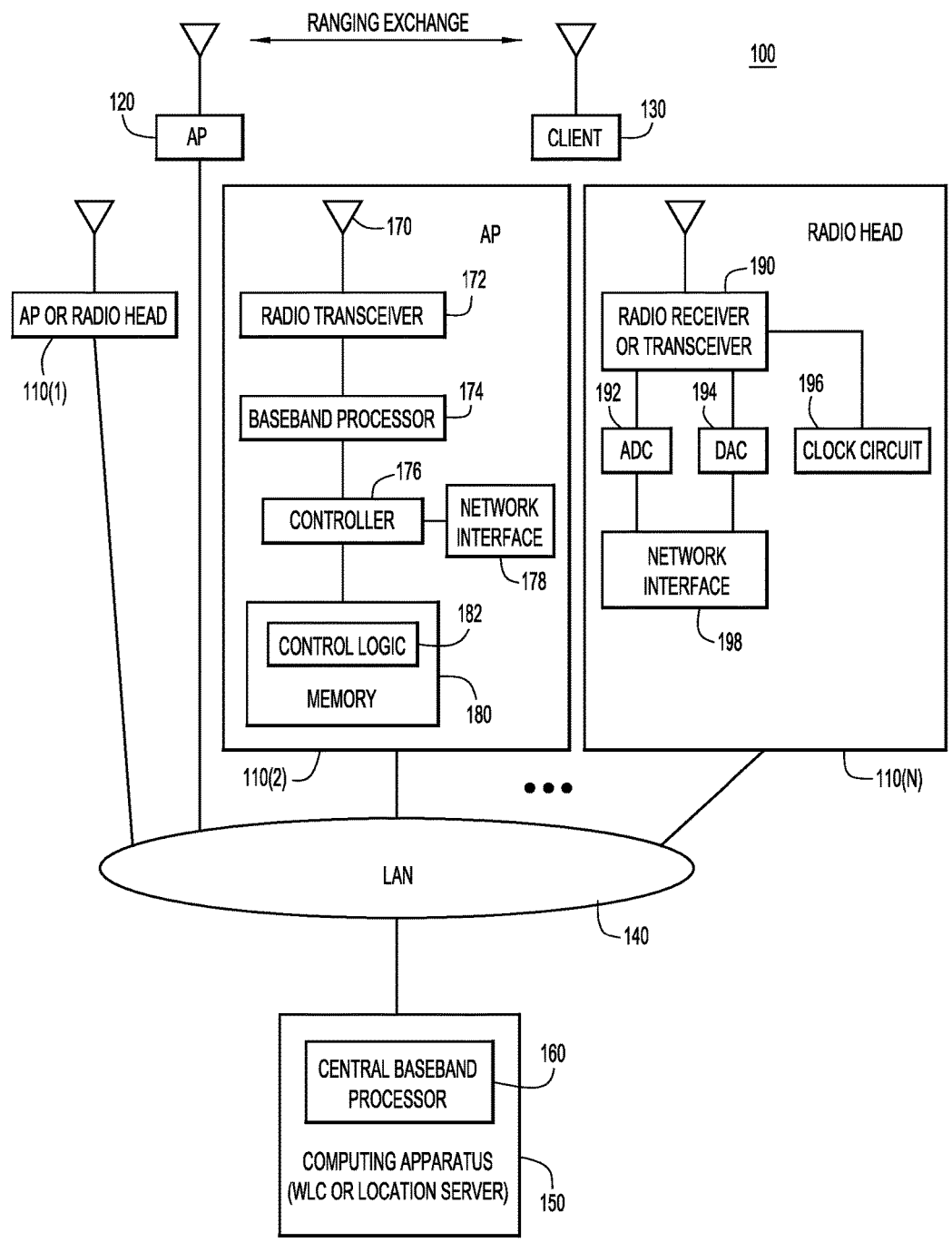
FIG. 2 is a system diagram of elements of the wireless network that are configured to perform the monitor radio assisted timing measurement techniques, according to an example embodiment.

Reference is now made to FIG. 2 for a detailed description of a system 100 configured to achieve a monitor radio assisted timing measurement for location applications. The system 100 includes a plurality of monitor radio devices, also referred to herein as a plurality of first wireless devices 110(1)-110(N), one or more of which may be in the vicinity of an AP 120, also referred to herein as a second wireless device, that is serving or otherwise in communication with a client device 130, referred to herein as a target wireless device. Thus, one or more of the radio devices 110(1)-110(N) may receive the signals sent between the AP 120 and client device 130. The AP 120 participating in the ranging exchange with the client device 130 is often referred to as the Time of Flight (ToF) AP.

The plurality of monitor radio devices 110(1)-110(N) may take on a variety of forms, including an AP or a radio head, as described in more detail below. Each of the plurality of radio devices 110(1)-110(N) and the AP 120 are connected to a wired local area network (LAN) 140. A computing apparatus 150 is also connected to the LAN 140 so that it is in communication with the plurality of monitor radio devices 110(1)-110(N) and the AP 120. The computing apparatus 150 may be WLAN controller (WLC) a location server, or other entity commonly found in a WLAN. In the case where one or more of the monitor radio devices 110(1)-110(N) are radio head devices, then there is a central baseband processor entity 160. FIG. 1 shows that the functions of the central baseband processor entity 160 may be implemented by the computing apparatus 150, however, it should be understood that the central baseband processor entity 160 may be separate from the computing apparatus 150.

FIG. 2 shows at reference numeral 110(2) an example in which a monitor radio device is an AP and shows at reference numeral 110(N) an example in which a monitor radio device is a radio head device. First, at 110(2), an AP may include antenna 170, a radio transceiver 172, a baseband processor (modem) 174, a controller (microprocessor or microcontroller) 176, a wired network interface 178, and memory 180 that stores instructions for AP control logic 182. The AP 110(2) may have multiple antennas and the radio transceiver 172 may have multiple transmitters and receivers, one for each antenna. The radio transceiver 172 performs downconverting to baseband of received radio frequency (RF) signals and upconverting to RF of baseband transmit signals. The baseband processor 174 performs baseband modulation to produce baseband transmit signals and baseband demodulation of received baseband receive signals. The baseband processor 174 may also perform various media access control (MAC) functions. The radio transceiver 172 and baseband processor 174 may be embodied as part of integrated circuit (IC) chipsets that are compliant with IEEE 802.11, for example.

The controller 176 performs higher-level control of the AP 110(2) and to this end executes instructions for the control logic 182 stored in memory 180. The network interface 178 is a network interface card (NIC) that enables wired network communication via the LAN 140.

A radio head, shown at 110(N), includes a radio receiver or radio transceiver 190 capable of transmission and reception of RF signals. An analog-to-digital converter (ADC) 192 is coupled to the radio receiver/transceiver 190 to convert analog receive signals to digital baseband receive signal data and a digital-to-analog converter (DAC) 194 is coupled to the radio receiver/transceiver 190 to convert digital baseband transmit data to analog signals for transmission by the radio receiver/transceiver 190 if the radio receiver/transceiver 190 has transmit capabilities. A clock circuit 196 is provided to allow for synchronization of the radio head device 110(N) with respect to others of the radio devices 110(1), 110(2), etc. The clock circuit 196 is coupled to the radio receiver/transceiver 190. A network interface 198 is provided to enable network communications via LAN 140 to the central baseband processor 160.

The central baseband processor 160 performs the baseband receive processing (and baseband transmit processing) for radio heads, such as radio head 110(N). The radio head merely handles the RF receive (and RF transmit) functions. In so doing, the central baseband processor 160 can determine times of reception of transmissions (sent between the AP 120 and the client device 130) at a given radio head, e.g., radio head 110(N). Conversely, an AP, such as AP 110(2), has the capability itself to determine times of reception of transmissions (sent between the AP 120 and the client device 130) through the capabilities of the baseband processor 174 and controller 176. The AP 110(2) would forward the times of reception data to the computing apparatus 150. Based on the times of reception recorded by or for the radio devices 110(1)-110N) of transmissions sent between the AP 120 and the client device 130 as part of a ranging procedure, the computing apparatus 150 can compute timing error information as described further below.

For monitor radio devices that are APs, the computing apparatus 150 can achieve synchronization among the APs to be sure the time of reception measurements made are with respect to a synchronized clock. Various techniques for synchronizing APs are known and may be used. Similarly, the central baseband processor 160 synchronizes radio head via the clock circuit 196 in each radio head, again to be sure that the time of reception measurements are made with respect to a synchronized clock.

Figure 3:
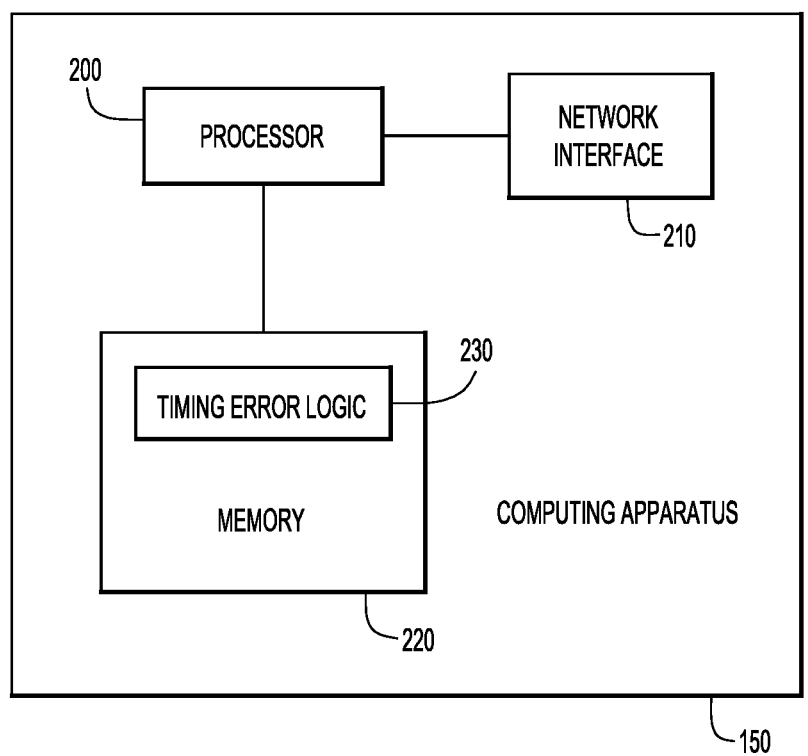
FIG. 3 is a block diagram of a computing apparatus configured to perform computations as part of the monitor radio assisted timing measurement techniques, according to an example embodiment.

FIG. 3 shows a block diagram of the computing apparatus 150. The computing apparatus 150 includes one or more processors 200, a network interface 210 and memory 220 that stores instructions for timing error logic 230. The processor(s) 200 may be one or more microprocessors or microcontrollers. The network interface 210 may be one or more network interface cards to enable network communications. The memory 220 may be read only memory (ROM), random access memory (RAM), magnetic disk storage media devices, optical storage media devices, flash memory devices, electrical, optical, or other physical/tangible memory storage devices. Thus, in general, the memory 220 may comprise one or more tangible (non-transitory) computer readable storage media (e.g., a memory device) encoded with software comprising computer executable instructions and when the software is executed (by the processor 200) it is operable to perform the operations described herein.

Figure 4:
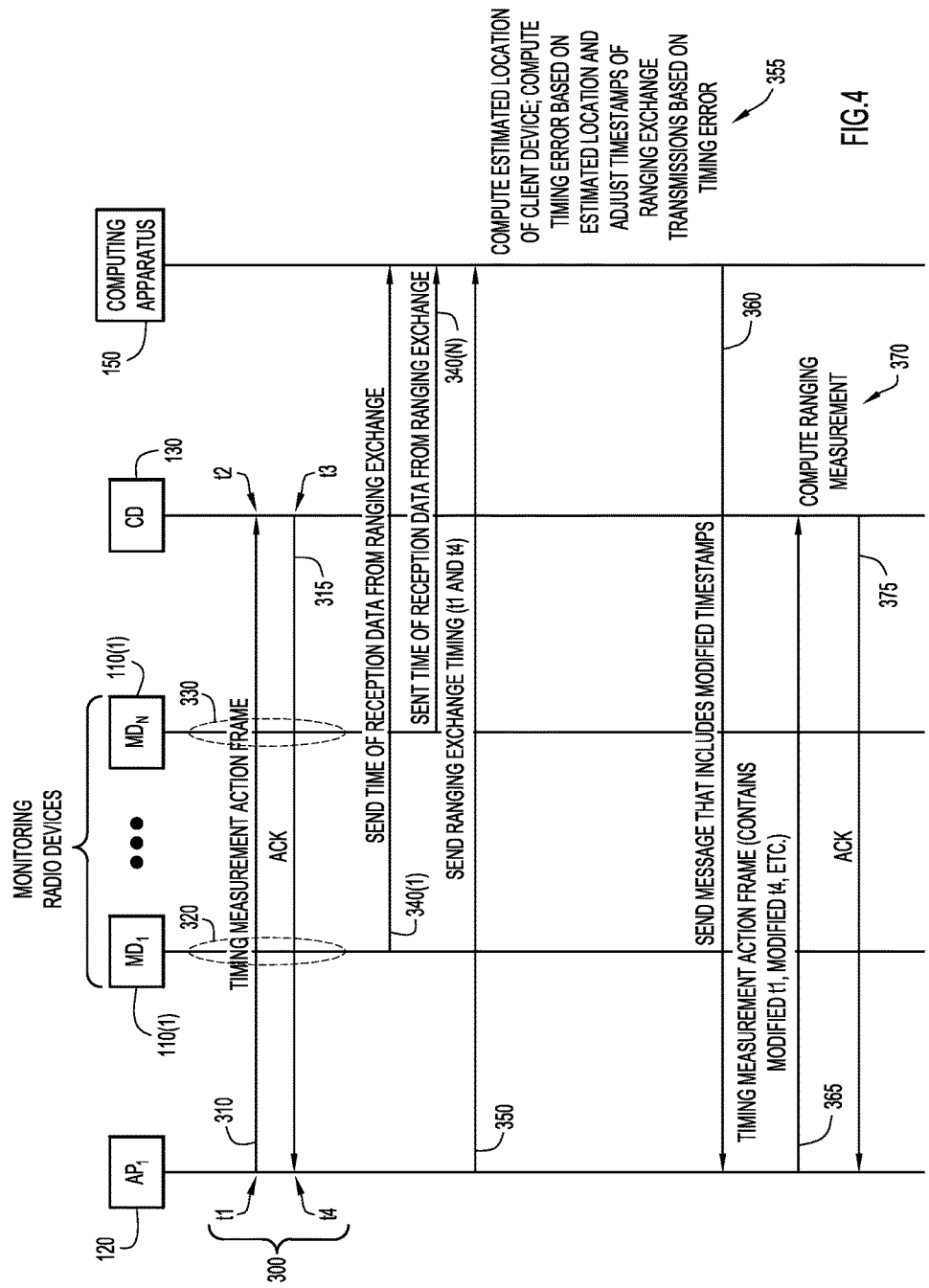
FIG. 4 is a sequence diagram depicting the signal transmissions and operations performed as part of the monitor radio assisted timing measurement techniques may be employed, according to an example embodiment.

Reference is now made to FIG. 4. FIG. 4 shows a timing diagram depicting the signal transmissions and operations performed as part of the monitor radio assisted timing measurement techniques to improve the accuracy of computations resulting from the ranging procedure. FIG. 4 shows monitor radio devices 110(1)-110(N), denoted $MD_1$-$MD_N$ in FIG. 4, are also receiving the transmissions between AP 120 and client device 130. In most cases, the locations of the AP 120 and of each of the monitoring devices 110(1)-110(N) are known. In one example, the operations depicted in FIG. 4 include a ranging exchange shown at 300 in FIG. 4. The ranging exchange 300 may be part of the fine time measurement procedures of IEEE 801.11mc.

Each timing measurement may involve three exchanges: a first exchange to schedule the timing measurement procedure; a second exchange to do the measurement procedure; and a third exchange to send the timing measurement data from the AP 120 to the client device 130. Reducing the number of these exchanges or achieving better location with a smaller number of measurements can help performance of the wireless network. For simplicity, only the significant exchanges are shown in FIG. 4.

At 310, the AP 120 transmits an action frame to the client device 130. At 315, assuming the client device 130 receives the action frame, it transmits an acknowledgment (ACK) back to the AP 120. The AP 120 records timestamps for transmission (Tx) and reception (Rx) events:

$t_1$ is time of Tx of action frame
$t_4$ is time of Rx of an acknowledgment (ACK) from the client device Similarly, the client device records timestamps for Tx and Rx events:

$t_2$ is time of Rx of the action frame
$t_3$ is time of Tx of the ACK

As shown at 320 and 330, each of the monitor radio devices 110(1)-110(N) receives the transmissions 310 and 315 sent between the AP 120 and the client device 130. Each monitor radio device can record times of receptions when the respective monitor device received each of the transmissions 310 and 315. As described further below, the monitor radio devices 110(1)-110(N) perform TDoA- or DRTT-based location using the times of reception obtained from the ranging exchange between the AP 120 and the client device 130 and the computing apparatus 150 modifies $t_1$ and $t_4$ which are sent back to the client device 130 to reflect a more accurate estimate. The client device is unaware of any change. It only experiences a better ranging estimate, and resulting location computation.

At 340(1)-340(N), the monitor radio devices 110(1)-110(N) send their time of reception data obtained by monitoring the ranging procedure 300. The time of reception data consists of, for each of the monitor radio devices, a time of reception of a first transmission (transmission 310) that is sent from the AP 120 to the client device 130 and a time of reception of a second transmission (transmission 315) that is sent from the client device 130 to the AP 120. The computing apparatus 150 may have knowledge of the ranging procedure 300 and thus know to notify the monitor radio devices 110(1)-110(N) to alert them to record the time of reception data for the ranging procedure 300 between AP 120 and client device 130, and to send their time of reception data to the computing apparatus 150.

Also, at 350, the AP 120 sends the ranging exchange timing data that the AP 120 determines from the ranging procedure 300 between the client device 130 and the AP 120. More specifically, the ranging exchange timing data sent at 350 are values for $t_1$ (time that the AP transmitted the first transmission at 310) and $t_4$ (time that the AP received the second transmission from the client device at 315) observed by AP 120.

At 355, the computing apparatus 150 computes an estimated location for the client device 130 based on the respective times of reception of the first transmission (310) and of the second transmission (315) at each of the monitor radio devices 110(1)-110(N) and based on time of reception data (e.g., timestamps for $t_1$ and $t_4$) determined by the AP 120 in participating in the ranging exchange 300 with the client device 130. The location estimate computed at 365 will be based on more time of reception data and therefore yield a more accurate location result than could otherwise be achieved from only data recorded by the AP 120 and client device 130 during the ranging procedure 300.

In addition, at 355, the computing apparatus 150 uses the estimated location to compute a timing error (as a measure of time, e.g., msecs). This timing error is denoted $T_{err,ap}$ and reflects what the values for $t_1$ and $t_4$ should be in order to generate the estimated location that the computing apparatus 150 computes based on the time of reception data obtained from the monitor radio devices 110(1)-110(N) and the AP 120. In other words, $T_{err,ap}=t_{4,expected}(x,y,z)-t_4$, where x,y,z is the estimated location of the client device computing by the computing apparatus 150 using all monitor radio devices 110(1)-110(N) and the AP 120. Said yet another way, computing the timing error involves computing an expected value for the time of reception of the second transmission (transmission 315) at the second wireless device for the estimated location computed for the target wireless device, and computing a difference between the expected value for the time of reception of the second transmission and a measured time of reception of the second transmission obtained from the second wireless device.

The computing apparatus 150 uses the timing error to adjust timestamps for $t_1$ and $t_4$ of the transmissions 310 and 315 by adding $T_{err,ap}$ to $t_4$ reported by the AP 120 and subtracting $T_{err,ap}$ from $t_1$ reported by AP 120. Thus, modified $t_4=T_{err,ap}+t_4$ and modified $t_1=t_1-T_{err,ap}$. The timing error $T_{err,ap}$ is added to $t_4$ and subtracted from $t_1$ so that the calculation of $T_{tof}$ at the client device removes the estimation error of the AP 120 and replaces it with the more precise estimation error of the AP 120 plus the monitor radio devices 110(1)-110(N).

At 360, the computing apparatus 150 sends to the AP 120 (or any other serving AP for the client 130), a message that includes first and second modified timestamps (modified $t_1$ and modified $t_4$).

At 365, the AP 120 wirelessly sends to the client device 130 a frame that includes the modified timestamps (modified $t_1$ and modified $t_4$). The frame sent at 365 may be a follow-up action frame that is part of the IEEE 802.11mc fine time measurement procedure. Thus, the client device is not aware of any of the additional computations and adjustments made to $t_1$ and $t_4$. At 370, the client device computes an improved ranging measurement using the modified timestamps. The client device calculates the time-of-flight (ToF)/ranging measurement according to the equation:

$$T_{tof} = (t_4 - t_1 + t_3 + t_2)/2$$

In making this computation, the client device 130 uses the modified timestamps for $t_1$ and $t_4$. Thus, without knowing that anything different has occurred, the client device 130 will compute a ranging estimate at 370 that will be more precise than it would have otherwise computed using the timestamp values of $t_1$ and $t_4$ that the AP 120 would have sent to the client device 130 without involvement of the monitor radio devices 110(1)-110(N). Thus, the client device 130 may compute a more precise ranging estimate as shown at reference numeral 60 in FIG. 1. At 375, the client device 130 sends an acknowledgment (ACK) frame to the AP 120. No changes are made to the operations normally performed at the client device as part of a ranging procedure.

The improved ranging measurement computed using the modified timestamps will be more accurate than could otherwise be computed based on time of reception data obtained by the AP 120 and client device 130 during the ranging procedure 300.

It is to be understood that in some embodiments, the ranging estimate of the client device 130 is computed by a device other than the client device 130, e.g., by the computing apparatus 150. In that case, there may be no need to send the modified timestamps to the client device 130.

It should be understood that the computations of the estimated location, timing error and modified timestamps could be computed by a serving AP for the client, such as AP 120, with the understanding that the times of reception data obtained by the monitor radio devices can be sent to AP 120.

Reference is now made to FIG. 5. FIG. 5 illustrates a flow chart for a method 400 according to the techniques presented herein. The method 400 is described in terminology not necessarily specific to WLANs. Thus, in one example, the term "first wireless devices" is used to refer to monitor radio devices, the term "second wireless device" may refer to an AP, and the term "target wireless device" may refer to a client device that is in communication with (associated to or served by) the AP. The monitor radio devices may take any form as described herein or variations thereto.

At 410, a plurality of first wireless devices monitor a ranging exchange of transmissions between a target wireless device and a second wireless device in order to record for each of the plurality of first wireless devices a (measured) time of reception of a first transmission that is sent from the second wireless device to the target wireless device and a (measured) time of reception of a second transmission that is sent from the target wireless device to the second wireless device. At 415, a computing apparatus, for example computing apparatus 150 referred to in connection with the previous figures, computes an estimated location for the target wireless device based on the respective times of reception of the first transmission and of the second transmission at each of the plurality of first wireless devices and based on a (measured) time of transmission of the first transmission by the second wireless device and a (measured) time of reception of the second transmission at the second wireless device obtained from the second wireless device.

At 430, the computing apparatus computes a timing error based on the estimated location. In one example, computing the timing error involves computing an expected value for the time of reception of the second transmission at the second wireless device for the estimated location computed for the target wireless device, and computing a difference between the expected value for the time of reception of the second transmission and the (measured) time of reception of the second transmission obtained from the second wireless device.

At 440, the computing apparatus modifies, with the timing error, the time of transmission of the first transmission from the second wireless device (e.g., $t_1$) to produce a first modified timestamp and modifies the time of reception of the second transmission at the second wireless device (e.g., $t_4$) to produce a second modified timestamp. For example, the timing error is added to the (measured) time of reception of the second transmission at the second wireless device to produce the second modified timestamp and the timing error is subtracted from the (measured) time of transmission of the first transmission from the second wireless device to produce the first modified timestamp.

At 450, the computing apparatus, the target wireless device or the second wireless device computes a ranging measurement of the target wireless device relative to the second wireless device using the first modified timestamp and the second modified timestamp.

As explained above, the computing the estimated location, the computing the timing error and the modifying operations 420, 430 and 440 may be performed at a computing apparatus (e.g., computing apparatus 150) that is communication with the plurality of first wireless devices and the second wireless device. In this case, the method 400 further includes receiving at the computing apparatus from the plurality of first wireless devices the respective times of reception of the first transmission and of the second transmission at each of the plurality of first wireless devices and from the second wireless device the time of transmission of the first transmission and the time of reception of the second transmission.

As explained above, in one form, the computing apparatus 150 performs the computation at 450 of the ranging measurement of the target wireless device with respect to the second wireless device. In another form, the computing apparatus sends the first modified timestamp and the second modified timestamp to the target wireless device, and the target wireless device computes the ranging measurement. More specifically, the computing apparatus sends the first modified timestamp and second modified timestamp to the second wireless device which in turn sends to the target wireless device a frame that includes the first modified timestamp and the second modified timestamp. Thus, operation 450 may be performed by the target wireless device.

In the examples described above, the second wireless device is a wireless access point device and the target wireless device is a wireless client device, and the ranging exchange is a part of a fine time measurement procedure in accordance with IEEE 802.11mc. Thus, the first transmission is a timing measurement action frame of the fine time measurement procedure and the frame that includes the modified first timestamp and the modified second timestamp sent to the target wireless device is a follow-up action frame of the fine time measurement procedure.

In summary, monitor radios in the network observe ranging exchanges and communicate a time correction value to the participating AP that corrects the timing error of that AP out of the FTM to produce better ToF location results for the client device. The location exchanges could be ToF location exchanges as described herein as well as other types, including could be Block Ack Request (BAR)/Block Ack (BA).

The monitor radio devices may take any of a variety of forms as described herein so long as they are configured for synchronized scanning and observing location exchanges. The Open Wireless Network Architecture (OWNA) has dedicated observation paths that can be used for this type of monitoring. However, the monitor radio assist techniques presented herein can be used for OWNA and non-OWNA systems. The difference between OWNA and non-OWNA is that OWNA has near perfect time synchronization and very low-latency paths from RF to the centralized baseband processor compute. For non-OWNA, the lack of time synchronization means that TDoA may be more challenging but assisting the ToF measurement can be done with DRTT location procedures.

While the embodiments described above are made with reference to use with IEEE 802.1 mc, they are also useful in other applications, such as IEEE 801.11az.

In summary, in one form, a method is provided comprising: at a plurality of first wireless devices, monitoring a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device; computing an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device; computing a timing error based on the estimated location; modifying, with the timing error, the time of transmission of the first transmission from the second wireless device to produce a first modified timestamp and modifying the time of reception of the second transmission at the second wireless device to produce a second modified timestamp; and computing a ranging measurement of the target wireless device relative to the second wireless device using the first modified timestamp and the second modified timestamp.

In another form, a system is provided comprising: at a plurality of first wireless devices configured to monitor a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device; a computing apparatus in communication with the plurality of first wireless devices and the second wireless device, wherein the computing apparatus is configured to: compute an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device; compute a timing error based on the estimated location; and modify, with the timing error, the time of transmission of the first transmission from the second wireless device to produce a first modified timestamp and modifying the time of reception of the second transmission at the second wireless device to produce a second modified timestamp.

In still another form, an apparatus is provided comprising: a network interface configured to enable network communications with at a plurality of first wireless devices and a second wireless device, wherein the plurality of first wireless devices are configured to monitor a ranging exchange of transmissions between a target wireless device and the second wireless device, the plurality of first wireless devices recording a time of reception of a first transmission that is sent from the second wireless device to the target wireless device and a time of reception of a second transmission that is sent from the target wireless device to the second wireless device; and a processor coupled to the network interface, wherein the processor is configured to: compute an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device; and compute a timing error based on the estimated location; and modify, with the timing error, the time of transmission of the first transmission from the second wireless device to produce a first modified timestamp and modifying the time of reception of the second transmission at the second wireless device to produce a second modified timestamp.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a plurality of first wireless devices, monitoring a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device;
    computing an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device;
    computing a timing error based on the estimated location;
    modifying, with the timing error, the time of transmission of the first transmission from the second wireless device to produce a first modified timestamp and modifying the time of reception of the second transmission at the second wireless device to produce a second modified timestamp; and
    computing a ranging measurement of the target wireless device relative to the second wireless device using the first modified timestamp and the second modified timestamp.

2. The method of claim 1, wherein computing the estimated location, computing the timing error and modifying are performed at a computing apparatus that is communication with the plurality of first wireless devices and the second wireless device, and further comprising:

receiving at the computing apparatus from the plurality of first wireless devices the respective times of reception of the first transmission and of the second transmission at each of the plurality of first wireless devices and from the second wireless device the time of transmission of the first transmission and the time of reception of the second transmission.

3. The method of claim 2, wherein computing the ranging measurement of the target wireless device with respect to the second wireless device is performed by the computing apparatus.

4. The method of claim 2, further comprising:
sending the first modified timestamp and the second modified timestamp to the target wireless device; and
wherein computing the ranging measurement comprises the target wireless device computing the ranging measurement.

5. The method of claim 4, wherein sending comprises the second wireless device sending to the target wireless device a frame that includes the first modified timestamp and the second modified timestamp.

6. The method of claim 4, wherein the target device computes the ranging measurement using the first modified timestamp, the second modified timestamp, a time of reception at the target wireless device of the first transmission, and a time of departure of the second transmission from the target wireless device.

7. The method of claim 4, wherein the second wireless device is a wireless access point device and the target wireless device is a wireless client device, and the ranging exchange is a part of a fine time measurement procedure in accordance with IEEE 802.11mc, and wherein the first transmission is a timing measurement action frame of the fine time measurement procedure and the frame including the first modified timestamp and the second modified timestamp sent to the target wireless device is a follow-up action frame of the fine time measurement procedure.

8. The method of claim 1, wherein computing the timing error comprises computing an expected value for the time of reception of the second transmission at the second wireless device for the estimated location computed for the target wireless device, and computing a difference between the expected value for the time of reception of the second transmission and the time of reception of the second transmission obtained from the second wireless device.

9. A system comprising:
a plurality of first wireless devices configured to monitor a ranging exchange of transmissions between a target wireless device and a second wireless device in order to record for each of the plurality of first wireless devices a time of reception of a first transmission that is sent from the second wireless device to the target wireless device and a time of reception of a second transmission that is sent from the target wireless device to the second wireless device;
a computing apparatus in communication with the plurality of first wireless devices and the second wireless device, wherein the computing apparatus is configured to:
compute an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device;
compute a timing error based on the estimated location; and
modify, with the timing error, the time of transmission of the first transmission from the second wireless device to produce a first modified timestamp and modify the time of reception of the second transmission at the second wireless device to produce a second modified timestamp.

10. The system of claim 9, wherein the computing apparatus sends to the second wireless device a message that includes the first modified timestamp and the second modified timestamp, and the second wireless device sends to the target wireless device a frame that includes the first modified timestamp and the second modified timestamp, to enable the target wireless device to compute, using the first modified timestamp and the second modified timestamp, a ranging measurement of the target wireless device relative to the second wireless device.

11. The system of claim 10, wherein the second wireless device is a wireless access point device and the target wireless device is a wireless client device, and the ranging exchange is a part of a fine time measurement procedure in accordance with IEEE 802.11mc, and wherein the first transmission is a timing measurement action frame of the fine time measurement procedure and the frame including the first modified timestamp and the second modified timestamp sent to the target wireless device is a follow-up action frame of the fine time measurement procedure.

12. The system of claim 9, wherein the computing apparatus is configured to compute, using the first modified timestamp and the second modified timestamp, a ranging measurement of the target wireless device relative to the second wireless device.

13. The system of claim 9, wherein the computing apparatus is configured to compute the timing error by computing an expected value for the time of reception of the second transmission at the second wireless device for the estimated location computed for the target wireless device, and computing a difference between the expected value for the time of reception of the second transmission and the time of reception of the second transmission obtained from the second wireless device.

14. The system of claim 9, wherein the plurality of first wireless devices are radio head devices that include at least one antenna and at least one receiver coupled to the at least one antenna, and further comprising a central baseband processing device separate from the radio head devices and in communication with the radio head devices, wherein the central baseband processing device synchronizes the radio head devices and records, for each of the plurality of first wireless devices, the time of reception of the first transmission that is sent from the second wireless device to the target wireless device and the time of reception of the second transmission that is sent from the target wireless device to the second wireless device.

15. The system of claim 14, wherein the computing apparatus comprises the central baseband processing device.

16. The system of claim 9, wherein the plurality of first wireless devices are wireless access points in communication with the computing apparatus.

17. An apparatus comprising:
a network interface configured to enable network communications with a plurality of first wireless devices and a second wireless device, wherein the plurality of first wireless devices are configured to monitor a ranging exchange of transmissions between a target wireless device and the second wireless device, the plurality of first wireless devices recording a time of reception of a first transmission that is sent from the second wireless device to the target wireless device and a time of reception of a second transmission that is sent from the target wireless device to the second wireless device; and a processor coupled to the network interface, wherein the processor is configured to:

compute an estimated location for the target wireless device based on the respective times of reception of the first transmission and of the second transmission at each of the plurality of first wireless devices and based on a time of transmission of the first transmission by the second wireless device and a time of reception of the second transmission at the second wireless device obtained from the second wireless device;

compute a timing error based on the estimated location; and modify, with the timing error, the time of transmission of the first transmission from the second wireless device to produce a first modified timestamp and modify the time of reception of the second transmission at the second wireless device to produce a second modified timestamp.

18. The apparatus of claim 17, wherein the processor is configured to cause to be sent to the second wireless device a message that includes the first modified timestamp and the second modified timestamp, such that the second wireless device sends to the target wireless device a frame that includes the first modified timestamp and the second modified timestamp, to enable the target wireless device to compute, using the first modified timestamp and the second modified timestamp, a ranging measurement of the target wireless device relative to the second wireless device.

19. The apparatus of claim 17, wherein the processor is configured to compute, using the first modified timestamp and the second modified timestamp, a ranging measurement of the target wireless device relative to the second wireless device.

20. The apparatus of claim 17, wherein the processor is configured to compute the timing error by computing an expected value for the time of reception of the second transmission at the second wireless device for the estimated location computed for the target wireless device, and compute a difference between the expected value for the time of reception of the second transmission and the time of reception of the second transmission obtained from the second wireless device.

* * * * *